April 18, 1939. W. E. AMBERG 2,155,031
EXPANDER RING
Filed Nov. 22, 1938
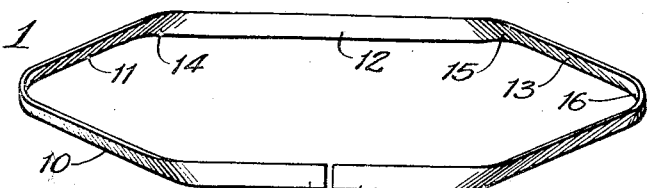
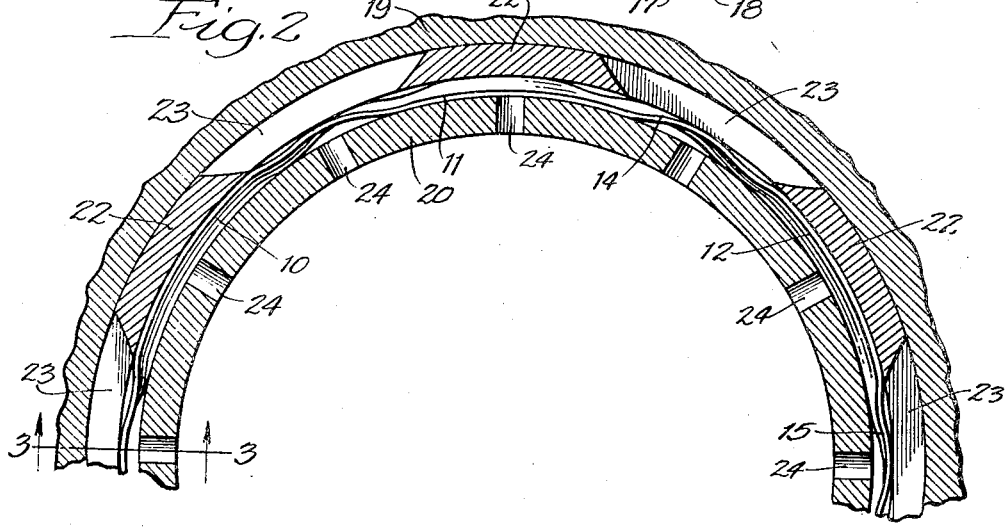
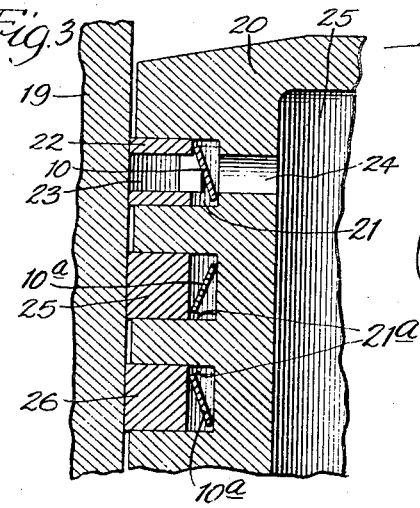 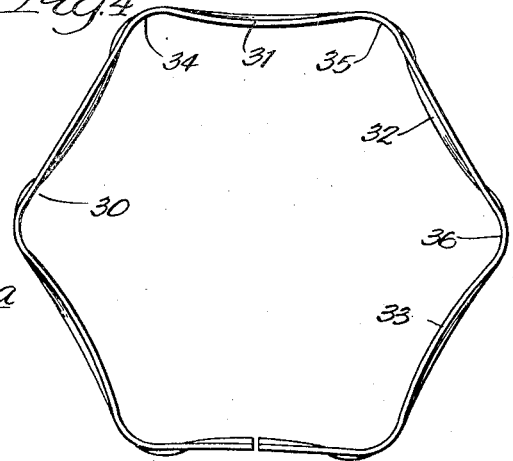
Inventor
Walter E. Amberg
By Banning & Banning
Attorney Patented Apr. 18, 1939

2,155,031

UNITED STATES PATENT OFFICE 2,155,031

EXPANDER RING

Walter E. Amberg, Chicago, Ill., assignor to Fred M. Friedlob, Chicago, Ill.

Application November 22, 1938, Serial No. 241,834

4 Claims. (Cl. 309—43)

An object of this invention is to provide a simple, efficient and inexpensive expander ring for use in piston ring grooves, behind certain of the piston rings, particularly the uppermost, for preventing an excess of oil being carried into the combustion chamber of the internal combustion engine on which it is used.

This and other objects as will hereinafter appear are accomplished by this invention, which is fully described in the following specification and shown in the accompanying drawing, in which—

Figure 1 is a perspective view of an embodiment of my invention;

Fig. 2 is a partial enlarged transverse section through a cylinder, piston, piston ring and piston ring groove showing my expander ring in place therein;

Fig. 3 is an enlarged partial section on line 3 of Fig. 2; and

Fig. 4 is a view similar to Fig. 1 showing a modified form.

Fig. 1 shows as a preferred embodiment of my invention an expander ring comprising a strip or ribbon of spring steel preferably rectangular in cross section and being of uniform width throughout. This strip is bent into the form of a polygon 10 preferably having an even number of sides, as six, for a purpose which will later be described.

The polygon has a series of plane surfaces or faces 11, 12, 13 which are reversely angled or inclined with respect to the longitudinal axis of the polygon, which axis corresponds to the axis of the piston to which it is to be applied. Between each two adjacent plane surfaces is an arcuate portion as 14, 15, 16. These arcuate portions are parts of cylinders and these cylinders are also alternately inclined as will be seen by reference to Fig. 1. Thus the cylinders 14, 15 are inclined toward each other and will meet at a point above the plane of the expander ring while the arcuate portions 15, 16 are inclined toward each other so that they will meet at a point below the plane of the expander ring. With a polygon having an even number of sides and with the opening in the expander ring substantially midway between arcuate portions, there will be two short ends 17, 18 which will be inclined in the same direction.

Referring now to Figs. 2 and 3, the expander ring is shown in connection with a cylinder 19 in which is slidably mounted a piston 20 having a piston ring groove 21 in which is slidably mounted a piston ring 22. This ring is provided with a series of slots 23 which pass completely through the ring and serve to convey oil from the surface of the cylinder to the piston ring groove 21. A series of oil holes 24 preferably located centrally of the piston ring groove serve to connect the groove with the space 25 within the piston.

Thus it will be seen that as long as the holes 23 and 24 are kept free, oil will flow from the surface of the cylinder to the space in the piston ring groove within the piston ring and thence through the holes 24 into the piston. The purpose of the present invention is to maintain a yieldable but constant pressure between the bottom of the piston ring groove and the piston ring by means of a yieldable expander ring which, however, will permit a free flow of oil from the cylinder wall to the space within the piston. The openings 23 are preferably in the form of slots which are much longer than their width so that in any case they are never more than partially closed by the arcuate portions of the expander ring. Oil from the cylinder wall can, therefore, readily find its way through the openings 23 and into the space 21 at the bottom of the piston ring groove.

Owing to the angularity of the plane surfaces with respect to the axis of the polygon and of the piston, the spring metal strip 10 assumes a position like that shown in Fig. 3 wherein the width of the strip is less than that of the groove and in which one edge of the strip will bear against the bottom of the piston ring groove and as the plane surface of the expander ring is inclined away from the holes 24, it leaves those holes free for the passage of oil.

Usually, the upper ring only is an oil collecting ring, while rings 25, 26 are plain compression rings. The latter may, if desired, be backed up by similar expander rings 10$^a$.

In both cases, the depth of the piston ring groove is fixed by the automobile manufacturer. It is desirable that the piston ring in both types be as thick as possible. Therefore, the space between the piston ring and the bottom of the groove should be as shallow as possible with proper provision for stiffness in the expander ring. These conditions are all met in the present construction due to the fact that this expander ring, since it preferably is not cut away but utilizes the full cross-section of the strip or ribbon, can be made thinner for a given strength. The thickness thus saved can be added to the thickness of the piston ring thereby greatly adding to its strength and wearing qualities.

It will also be observed that due to the angularity of the cylindrical portions 14, 15, the element on the outer surface in contact with the inner surface of the piston ring will be inclined at the same angle. As a result this bearing surface will be longer than the width of the ribbon thereby greatly adding to the life of the expander ring.

In Fig. 4 is shown a modified form of expander ring 30 which is the same as that previously described except that the sides of the polygon instead of being straight are curved inwardly. The sides 31, 32, 33, etc. are alternately reversely inclined and have reversely angled cylindrical portions 34, 35, 36. This will provide a stiffer ring for a given material and cross-section than that shown in Fig. 1.

While I prefer to utilize the full strength of the ribbon from which the expander ring is made, the strip may, if desired, be perforated or have recesses cut in its edge or edges to provide additional drainage for oil if it is required for any reason.

From the foregoing it will be seen that I have provided an expander ring which will insure removal of excess oil from the upper part of the cylinder wall when this ring is used in the upper piston ring groove and which is very strong and efficient, pressing the piston ring outwardly against the cylinder wall due to the fact that this expander ring has not been weakened in any way by cutting or punching but utilizes the full strength of the ribbon or strip of metal. Thus it will be seen that I have provided a very simple and efficient, yet inexpensive, expander ring.

I claim:

1. An expander for piston rings comprising a strip of spring metal of general polygonal shape, said expander having sides of substantially plane surfaces and arcuate portions connecting adjacent sides, the plane surfaces of adjacent sides being reversely inclined with respect to the axis of the polygon.

2. In combination, a piston having a piston ring groove, a piston ring in the groove, a series of holes connecting the piston ring groove with the interior of the piston, a series of holes through the piston ring connecting the inner and outer surfaces of the piston ring, and an expander in the groove within the piston ring, said expander comprising a strip of spring metal of general polygonal shape, said expander having sides of substantially plane surfaces and arcuate portions connecting adjacent sides, the plane surfaces of adjacent sides being reversely inclined with respect to the axis of the polygon whereby the inclined surfaces will not cover said holes but will permit the flow of oil therethrough.

3. In combination, a piston having a piston ring groove, a piston ring in the groove, a series of holes connecting the piston ring groove with the interior of the piston, a series of holes through the piston ring connecting the inner and outer surfaces of the piston ring, said holes being located substantially centrally of the piston ring and groove, and an expander in the groove within the piston ring, said expander comprising a strip of spring metal of general polygonal shape, said expander having sides of substantially plane surfaces and arcuate portions connecting adjacent sides, the plane surfaces of adjacent sides being reversely inclined with respect to the axis of the polygon whereby inclined surfaces will not cover said holes but will permit the flow of oil therethrough.

4. An expander for piston rings comprising a strip of spring metal of general polygonal shape having sides which are alternately reversely inclined with respect to the axis of the polygon, said sides being connected by arcuate portions cylindrical in form, the axes of adjacent cylinders being alternately reversely inclined with respect to the plane of the expander ring and to each other.

WALTER E. AMBERG.